UNITED STATES PATENT OFFICE.

EDWARD VICTORINE, OF CEDAR RAPIDS, IOWA.

EGG-PRESERVING COMPOUND.

1,423,053.  Specification of Letters Patent.  Patented July 18, 1922.

No Drawing.  Application filed September 8, 1921. Serial No. 499,272.

*To all whom it may concern:*

Be it known that I, EDWARD VICTORINE, a citizen of the United States, residing at Cedar Rapids, in the county of Linn and State of Iowa, have invented certain new and useful Improvements in Egg-Preserving Compounds; and I do hereby declare the following to be a full, clear, and exact description of the invention, such as will enable others skilled in the art to which it appertains to make and use the same.

The object of this invention is to produce a liquid compound for the preservation of eggs in a sound, sweet and palatable condition from season to season.

The invention consists of a solution formed of the following ingredients, in approximately the proportions given, the following formula being employed in the commercial preparation of the article for the market:

1. Calcium oxide, (hydrate) _____ 98.63
   Aluminium and ferric oxides _____ .41
   Magnesium oxide _____ .96
                                    ─────
                                     100

2. Sodium chloride _____ 99.18
   Calcium sulphate _____ .54
   Calcium chloride _____ .19
   Magnesium chloride _____ .05
   Insoluble matter and moisture ____ .04
                                    ─────
                                     100

Of the above ingredients, 150 parts by weight of the first group, and 100 parts by weight of the second group are dissolved in 250 parts by weight of boiling water. When cold the solution is ready for use.

Experience has shown that the preservative virtue of the compound depends very largely on the purity of the ingredients, particularly the calcium oxide. Ordinary unslaked lime contains many impurities, which need to be eliminated in order that the product may be practically pure calcium oxide. Such natural, unslaked lime is furthermore so caustic in character as to be more or less injurious to the egg, and tends to impart to it a limy flavor. The calcium oxide above specified is to be understood as a practically pure oxide of calcium, and is prepared for use in this preservative by subjecting the native unslaked lime to the action of steam until the pure material is precipitated as a white flaky mass, which is then quickly dried by a current of hot air.

The eggs may be carefully packed in a suitable container, preferably an earthen jar, and the solution poured over them, or the eggs may be dropped in the solution, as preferred. There should be about two inches of the liquid over the top layer of eggs. The package, covered to prevent undue evaporation, may be set in any convenient place, free from bad odors, and moderately cool.

Preserved in this manner, eggs packed in the spring will be found the following spring practically unchanged. For all culinary purposes they meet all the requirements of fresh-laid eggs, beating to the lightest froth. They have also the characteristic feel of fresh eggs, a delicate roughness of surface readily discerned by the touch. This fine, web-like coating of the shell, common to fresh eggs, is imparted mainly by the minor ingredients. The calcium oxide penetrates to all parts of the solution, and acts as a general purifier and powerful germicide. In combination with the other ingredients it forms an envelope for the egg-shell which is impenetrable by the deteriorating influences always at work upon an unprotected egg.

The function of the chloride of sodium is the familiar one of a preservative. Combined with the other ingredients it arrests and prevents decay by investing the eggs in a uniform solution which excludes the agencies which promote such decay. Its own natural tendency to impart a saline flavor to the egg is prevented, however, by the complete sealing of the pores of the egg shell by the other ingredients.

I claim:

An egg-preserving compound, consisting of the following ingredients in substantially the proportions stated, in parts and decimal parts by weight: calcium oxide, 148; aluminium and ferric oxides, 0.60; magnesium oxide, 1.40; sodium chloride, 99.20; calcium sulphate, 0.50; calcium chloride, 0.20; magnesium chloride, 0.05; insoluble matter and moisture, 0.05; water, 250.

In testimony whereof I affix my signature in presence of two witnesses.

EDWARD VICTORINE.

Witnesses:
F. W. ARMSTRONG,
D. L. WOOD.